United States Patent [19]

Wakasugi et al.

[11] Patent Number: 5,151,837
[45] Date of Patent: Sep. 29, 1992

[54] COMPOSITE MAGNETIC HEAD

[75] Inventors: Makoto Wakasugi; Takao Kasai, both of Saitama, Japan

[73] Assignee: Citizen Watch Co., Ltd., Tokyo, Japan

[21] Appl. No.: 638,766

[22] Filed: Jan. 8, 1991

[30] Foreign Application Priority Data

Jan. 12, 1990 [JP] Japan .................................. 2-5981
Mar. 13, 1990 [JP] Japan ................................. 2-60095

[51] Int. Cl.⁵ ............................. G11B 5/11; G11B 5/60
[52] U.S. Cl. .................................... 360/103; 360/128; 29/603
[58] Field of Search ............... 360/104, 128, 103, 121; 29/603

[56] References Cited

U.S. PATENT DOCUMENTS 3,922,776 12/1975 Alger et al. ......................... 360/103
4,636,900 1/1987 Tung et al. ......................... 360/103
5,008,767 4/1991 Iwata et al. ......................... 360/103
5,033,184 7/1991 Tandai et al. ....................... 360/103

Primary Examiner—Robert S. Tupper
Attorney, Agent, or Firm—Koda and Androlia

[57] ABSTRACT

A magnetic head includes a core chip, a slider having an aperture for receiving the core chip and protrusions for positioning and constraining the core chip received in the aperture. The protrusions are formed on the inner walls of the aperture. After the core chip has been inserted into the aperture, a molten welding material is flowed into the clearance between the core chip and the inner walls of the aperture so as to weld the core chip to the inner walls of the aperture in the slider. The clearance between the core chip and the inner walls of the aperture is equalized. If the core chip is formed of soft magnetic material, the slider can absorb electromagnetic noises.

17 Claims, 9 Drawing Sheets

COMPOSITE MAGNETIC HEAD

BACKGROUND OF THE INVENTION

1. Field of the Invention

The present invention relates to a magnetic head used to make the recording, reproducing and erasing of information in a magnetically recording system such as floppy disc drive, hard disc drive or the like.

2. Description of the Related Art

FIG. 7 is an perspective exploded view of the primary parts of a conventional magnetic head. The magnetic head shown herein comprises, as its primary components, a core chip 10, a slider piece (small) 12 and a slider piece (large) 4, the core chip being sandwiched between these slider pieces 12 and 14.

The core chip 10 is made of ferrite and includes a recording and reproducing gap 16 and an erasing gap 18 all of which are formed on the core chip 10 at the top thereof.

On the other hand, the slider pieces 12 and 14 are formed of calcium titanate ceramics and form a slider 20.

The slider pieces 12 and 14 are adhered to the core chip 10 respectively at its opposite sides by any suitable adhesive means such as organic adhesive or inorganic glass to form a magnetic head.

FIG. 8 is a perspective view of the magnetic head thus formed.

Since the slider 20 is defined by two parts, that is, the slider piece 12 and the slider piece 14, such a conventional magnetic head requires that the respective parts are machined separately. On manufacture, there are required a series of operations such as installation of the core chip 10 between the slider pieces 12 and 14, polishing of the mating surfaces of the core chip 10 and slider pieces 12, 14 and others. This contributes to increase of manufacturing cost in the entire system.

In order to overcome such a disadvantage, a magnetic head including a slider integrally moulded thereinto as shown in FIGS. 9A to 9C has been developed (see Japanese Patent Laid-Open No. 62-217413, for example).

FIG. 9A shows an integrally moulded slider 120 having a top face 120a in which a core chip holding aperture 122 is opened. The core chip holding aperture 122 is of a rectangular cross section corresponding to the configuration of the core chip 110. The core chip holding aperture 122 extends downwardly from the top face 120a of the slider 120 therethrough.

The core chip holding aperture 122 receives the core chip 110 shown in FIG. 9B initially from the side of legs 111 thereof. The core chip 110 is fixed to the slider 120 by the use of a rod of inorganic glass 124 shown in FIG. 9C. More particularly, the inorganic glass rod 124 is fused after it has been located between the outer wall of the core chip 110 and the inner wall of the core chip retaining aperture 122. As a result, the core chip 110 will be firmly adhered to the inner wall of the core chip holding aperture 122.

When the core chip 110 is mounted in and adhered to the slider 120 as described above, the core chip 110 may take its various different positions relative to the core chip holding aperture 122, as shown in FIGS. 10A, 10B and 10C. As seen from FIG. 10A, for example, the core chip 110 may be located closer to one of the shorter sides of the aperture 122. The core chip 110 may be differently positioned closer to one of the longer sides of the aperture 122, as seen from FIG. 10B. Furthermore, the core chip 110 may be disposed skewedly within the core chip holding aperture 122, as shown in FIG. 10C.

If the core chip is simply inserted into the core chip holding aperture 122 as described above, it is difficult to maintain a clearance between the core chip 110 and the aperture 122 equally from one slider to another slider. If a core chip 110 is skewedly located within the core chip holding aperture 122, more concretely, the minimum clearance becomes about one microns while the maximum clearance is ranged between about 20 microns and about 30 microns. In such a situation, if the core chip 110 is adhered to the core chip holding aperture 122, it is required at the minimum clearance that an inorganic glass rod 124 is fused at a higher temperature and for a longer time period than those required in an inorganic glass rod at the maximum clearance so that the molten glass rod can enter the minimum clearance very well.

FIG. 11 shows a graph representing the relationship between the magnitude of clearance and the velocity of entrance of glass into the clearance. In this graph, the vertical axis represents the velocity of entrance v and the horizontal axis represents the magnitude of clearance d where the temperature of fusion and the material of glass are invariable. As will be apparent from this graph, the smaller the magnitude of clearance, the lower the velocity of entrance of glass.

If the factors relating to temperature and time are set relative to smaller magnitudes of clearance, thus, the molten amount of inorganic glass rod 124 will unnecessarily overflow out of the maximum clearance. On the other hand, if these factors are set to larger magnitudes of clearance, the molten inorganic glass rod 124 will not sufficient enter the minimum clearance, resulting in imperfect adhesion.

Even if the slider is formed into one piece, any adjustment of clearance is required. However, even such an adjustment of clearance cannot easily aid to mount the core chip in the core chip retaining aperture precisely.

There is also known a magnetic head which comprises a slider and a shield ring disposed to surround the outer periphery of the slider. The slider is made of calcium titanate ceramics or barium titanate ceramics while the shield ring is made of permalloy or the like.

For example, a floppy disc drive generates electromagnetic noises from a spindle motor used as a drive source for rotating the floppy disc, a pulse motor used as a drive source for moving a magnetic composite head to a desired track across the rotating floppy disc and their drive circuits.

Further, word processors and personal computers which are provided with floppy disc drives generally include a CRT display which generates strong electromagnetic noises.

If the electromagnetic noises enter the core, its S/N ratio (ratio of signal to noise level) may be degraded and the symmetry in write waveform may be disturbed. These phenomena can create errors on reading.

The shield ring is for preventing the electromagnetic noises from reaching the composite magnetic core. For limitation in respect to available space, the thickness of the shield ring cannot be increased indefinitely. It is thus customary to make the shield ring from a sheet material having a thickness of about 0.2 mm.

In view of easy workability, the shield ring is frequently manufactured by means of bending or deep drawing. This is a reason why the material of the shield ring is generally permalloy.

Although the permalloy has a large magnetic permeability over a wide range from direct current to low frequency region, however, its magnetic permeability is decreased in high frequency region from several tens to several hundreds kHz which is utilized on writing and reading in the conventional floppy disc drive. It is thus impractical to use the magnetic shield ring formed of permalloy in shielding any electromagnetic noise mentioned above.

SUMMARY OF THE INVENTION

It is therefore an object of the present invention to provide a magnetic head which can be manufactured with decreased cost by using an integrally formed slider rather than a split slider and in which a core chip can be mounted in the slider more simply with a good clearance.

Another object of the present invention is to provide a magnetic head which can be produced inexpensively with reduction of adverse affection from electromagnetic noises, in comparison with the conventional magnetic heads having a shield ring.

To accomplish the first mentioned object of the present invention, the present invention provides a magnetic head comprising:

a) a core chip made of magnetic material and having a predetermined number of gaps which are formed on the face of the core chip to be engaged by a magnetic recording medium;

b) a slider having a core chip holding aperture opened at the surface of the slider for receiving the core chip, said slider including a predetermined number of protrusions formed on the inner wall of the core chip holding aperture for positioning the core chip received within the aperture; and c) a fusible member adapted to enter the interior of the core chip holding aperture received the core chip when the fusible member is fused and to weld the core chip with the slider after the fused member has set.

In such an arrangement, the magnetic head is characterized by the core chip positioning protrusions formed on the inner wall of the core chip holding aperture which is formed in the slider and opened at the surface thereof. When the core chip is to be inserted into the holding aperture, the positioning protrusions centers the core chip and also limits the attitude thereof. In other words, the core chip is disposed within the holding aperture always with a substantially fixed clearance. The magnitude of this clearance will vary depending on the relationship between the core chip positioning protrusions and the core chip holding aperture in respect to size and shape. It is of course to accept a play more or less. However, the clearance can be equalized more than the conventional magnetic heads utilizing a one-piece type slider. Further, this facilitates the insertion of core chip into the aperture of the slider.

This equalization also facilitates the choice of condition in which the fusible member is fused and enters the core chip holding aperture of the slider. In other words, the present invention only requires the setting of the aforementioned condition depending on a uniform clearance previously set. Thus, the velocity of entrance of the fusible member can be equalized to prevent any insufficient entrance or any overflow of the fusible member.

In such a manner, the present invention can provide a magnetic head in which the clearance can be equalized in a simple operation and which can be manufactured inexpensively from the use of a one-piece type slider.

The second object of the present invention aforementioned can be realized by partially limiting the above-mentioned arrangement. More particularly, it is preferred that the slider is formed of soft magnetic material such as $M_nZ_n$ ferrite or the like. By such a choice of magnetic material, the first and second objects of the present invention aforementioned can be accomplished simultaneously.

Although the basic configuration of the present invention has been described, the present invention will further be described in more detail with respect to its preferred embodiment.

The protrusions for positioning the core chip in the slider may be formed on (1) the longer opposed inner walls of the core chip holding aperture; (2) the shorter opposed inner walls of the core chip holding aperture; or (3) a combination thereof. In the position (1), the core chip can be positioned and constrained with respect to the spacing between the longer inner walls. In the position (2), the core chip can be positioned and constrained with respect to the spacing between the shorter inner walls. In the position (3), the core chip can be positioned and constrained within the core chip holding aperture in all the directions.

The core chip positioning protrusions are not limited to any particular shape, but may be of a square cross-section.

The fusible member is not limited to any particular material if it can attain the purpose thereof, but may be made of glass, for example.

If the slider is formed of soft magnetic material, it is preferred that the inner wall of the core chip holding aperture in the slider is coated with non-magnetic material such as oxide. This is for a purpose that it is intended to prevent any secondary gap from creating as at a point of contact of the core chip positioning protrusions with the slider due to any magnetic flux which may be produced in the slider since the latter is formed of the soft magnetic material.

The inner oxide-coated wall of the core chip holding aperture in the slider may be attained as by surface oxidation. By regulating temperature and partial oxygen pressure in the surface oxidation, the thickness of the oxide layer can be adjusted. If the thickness of the oxide layer is ranged between about 100 microns and about 300 microns, the creation of secondary gap can be most effectively avoided.

DETAILED DESCRIPTION OF THE PREFERRED EMBODIMENTS

The present invention will now be described by way of example with reference to the drawings.

Figure 1:
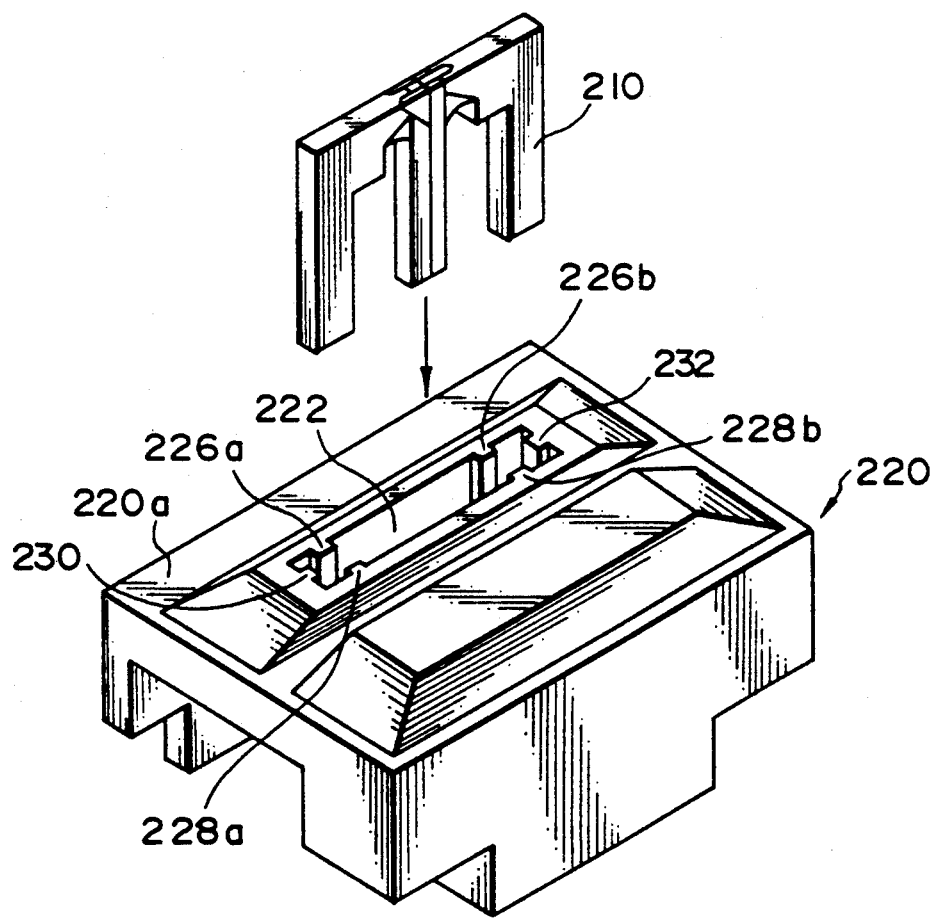
FIG. 1 is a perspective exploded view of one embodiment of a magnetic head constructed in accordance with the present invention.

Referring now to FIG. 1, there are shown a combination of a slider with a core chip which defines one embodiment of the present invention. The slider 220 is formed into one piece and includes a core chip holding aperture 222 which is formed therethrough and opened at the top face 220a thereof The aperture 222 receives the core chip 210 through the top opening thereof, as shown by arrow in FIG. 1. This is the same as in the prior art.

This embodiment is characterized by the configuration of the core chip holding aperture 222. In this embodiment, the core chip holding aperture 222 is of a rectangular cross-section with two longer opposed inner walls each including two protrusions 226a and 226b; 228a and 228b. The aperture 222 also includes a protrusion 230 or 232 formed thereon at each of the shorter opposed inner walls thereof. When the core chip 210 is inserted into the aperture 222, the core chip 210 is positioned and constrained by the inner ends of the protrusions 226a, 226a, 228a, 228b, 230 and 232.

Figure 2:
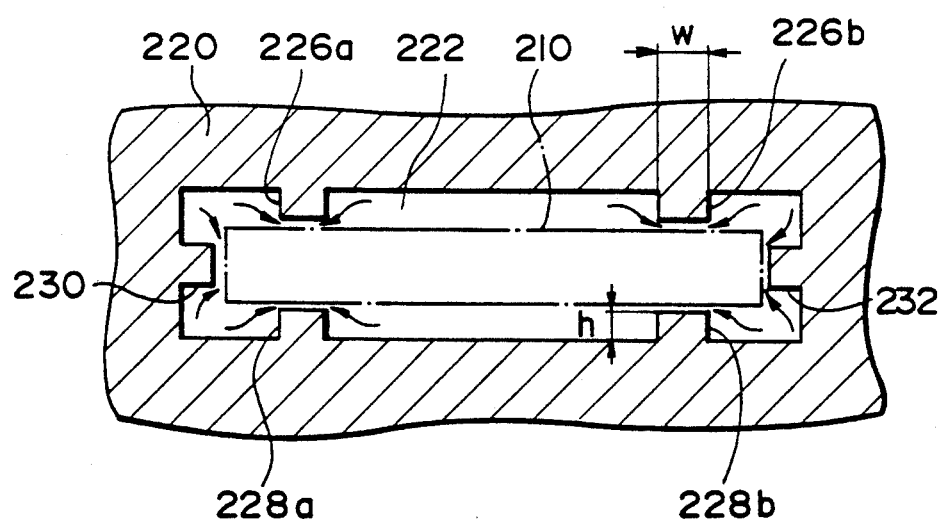
FIG. 2 is a partial cross-section of the magnetic head shown in FIG. 1, illustrating the flow of the fusible member.

Referring next to FIG. 2, there is shown the core chip 210 after it has been inserted into the core chip holding aperture 222. As will be apparent from this figure, the core chip 210 is surrounded by the inner ends of the protrusions 226a-232. It should be appreciated that the core chip 210 is schematically shown by alternate long and short dot line in FIG. 2 so that the flow of fusible material can be illustrated more clearly.

In this embodiment, the spacing between the inner end of each of the protrusions 226a, 226b, 228a, 228b, 230 and 232 and the corresponding one of the outer walls of the core chip 210, which will be called "clearance", will vary depending on the position and/or attitude of the core chip 210 inserted into the core chip holding aperture 222 of the slider.

As seen from FIG. 2, however, there is provided a substantially constant clearance (equal to the height h of the protrusions or more) between the inner walls of the core chip holding aperture 222 and the protrusions 226a-232 even at the majority of areas other than the protrusions 226a-232.

Figure 11:
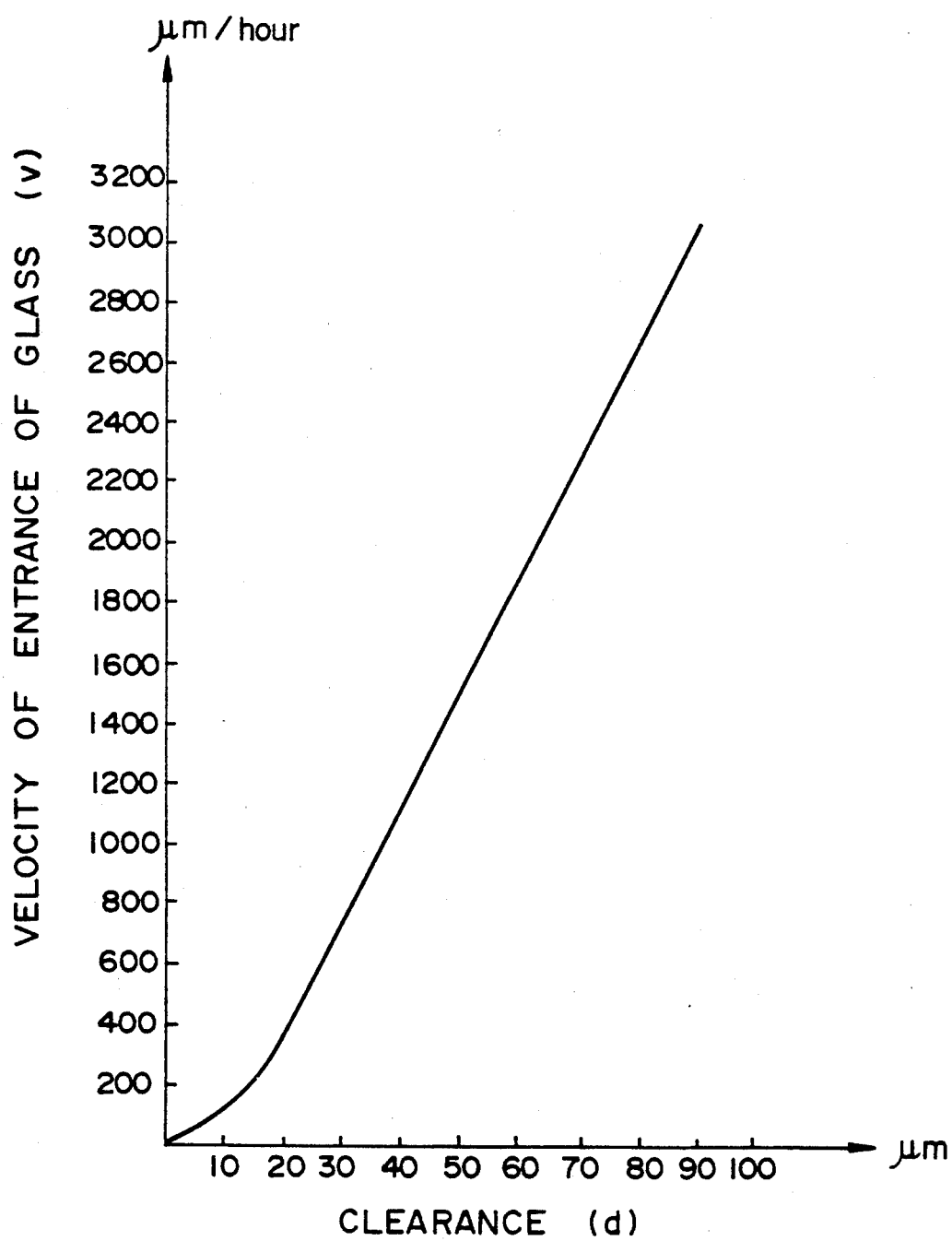
FIG. 11 is a graph showing the relationship between the velocity of entrance of glass into the core chip holding aperture and the clearance in the prior art.

At these areas, therefore, the velocity of entrance of the molten inorganic glass rod becomes substantially constant, as seen from FIG. 11. As in the prior art, the molten inorganic glass rod will enter the clearance between the core chip and the slider to perform welding therebetween. Thus, a substantially constant velocity of entrance can be accomplished as a whole, even though there is any difference in clearance at the inner end faces of the respective protrusions 226a-232.

At the inner ends of the protrusions 226a-232, the entrance of molten glass is attained through the opposite sides of each of the protrusions 226a-232 as shown by arrow in FIG. 2, in addition to the entrance of glass flow through the top of each protrusion. Therefore, the flow of molten glass can enter all the clearance sufficiently.

Therefore, even by setting a given condition of welding for the maximum clearance, the flow of molten glass may entrance all the clearance substantially uniformly neither too much nor too less.

Since the core chip 210 is retained in the aperture 222 by the inner ends of the protrusions 226a-232, any irregular surface on the inner walls of the aperture 222 other than the protrusions will not affect to the welding of the core chip 210.

On manufacture of the slider 220, the inner walls of the core chip holding aperture 222 may be finished relatively roughly (or without need of any precise finishing). Thus, the control of manufacture process and size can be performed easily. Particularly, the core chip holding aperture 222 may be rounded at its four corners so that any inconvenience such as hair crack or the like will not be created on moulding, sintering and welding steps. This results in improvement of yield.

The number of protrusions on the inner walls of the core chip holding aperture 222 may be increased or decreased, if desired. The height of the protrusions may also be varied unless it is out of the purpose that the entrance of molten glass flow can be attained substantially uniformly More particularly, it is preferred that the clearance between the core chip 210 and the core chip holding aperture 222 is normally ranged between about 10 microns and about 100 microns, depending on the mechanical strength of a single slider 220 and the time required in the entrance of molten glass flow into the clearance. Correspondingly, the height of the protrusions will be necessarily ranged between about 10 microns and about 100 microns.

The inorganic glass rod used as welding material contains an oxide of alkaline metal such as $Na_2O$, $K_2O$ or the like, such that the coefficient of thermal expansion in the inorganic glass rod becomes equal to those of the core chip 210 and slider 220. It is, however, impossible to provide the coefficient of thermal expansion in the glass rod which is perfectly equal to those of the core chip 210 and slider 220. In order to reduce the remaining metal after welding and to maintain the performance of the magnetic head, it is required that the volume of the entered glass is decreased as little as possible. For such a purpose, it is desired that the height h of the protrusions is ranged between 10 microns and 30 microns.

The width w of the protrusions 226a-232 is desirably selected as small as possible in order to prevent insufficient amount of charged glass. However, the width w of the protrusions is preferably designed to be about 50 microns in consideration of the difficulty of manufacture on the mould for the slider 220 and the mechanical strength of the protrusions.

The magnetic head constructed according to the present invention is effectively usable as a composite type magnetic head also in hard disc drives in addition to floppy disc drives.

The embodiment of the present invention aforementioned has the following advantages: The magnetic head can be manufactured more inexpensively by the use of a one-piece type slider. The core chip 210 can be mounted and welded in the slider 220 more precisely in a more easy and simple manner. This overcomes the difficulty of manufacture in the prior art and provides a magnetic head which is manufactured more inexpensively.

Figure 3:
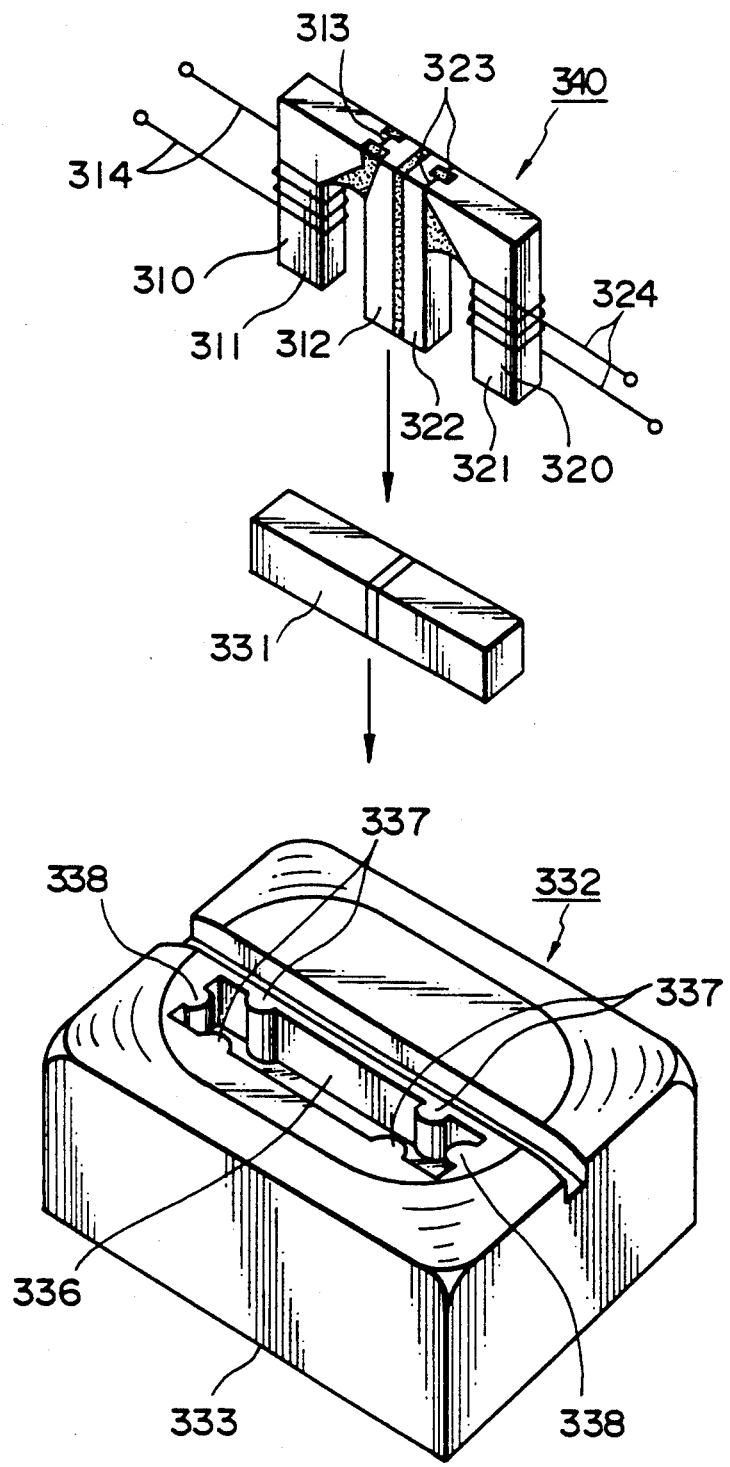
FIG. 3 is a perspective exploded view of the second embodiment of a magnetic head constructed in accordance with the present invention.
Figure 4:
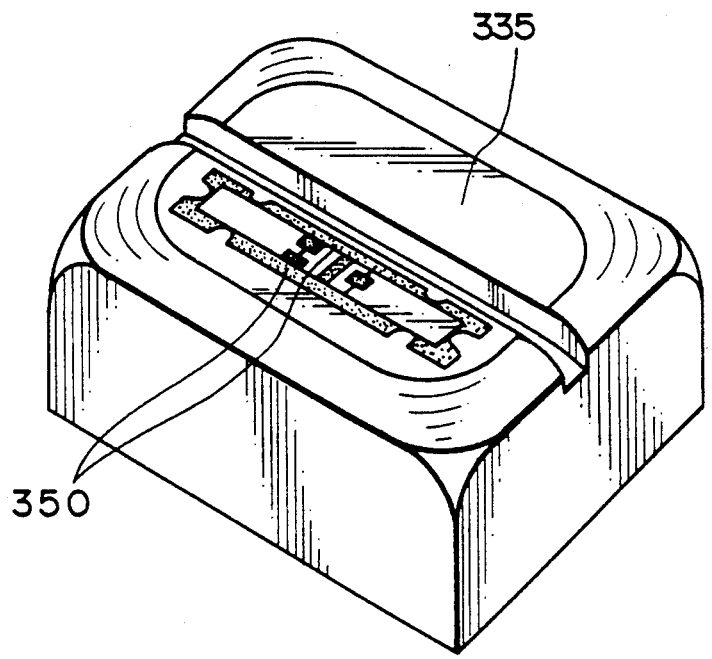
FIGS. 4 and 5 are perspective views illustrating the configuration of the second embodiment after assembled, FIG. 4 showing the front face of the magnetic head while FIG. 5 showing the back face of the same.
Figure 5:
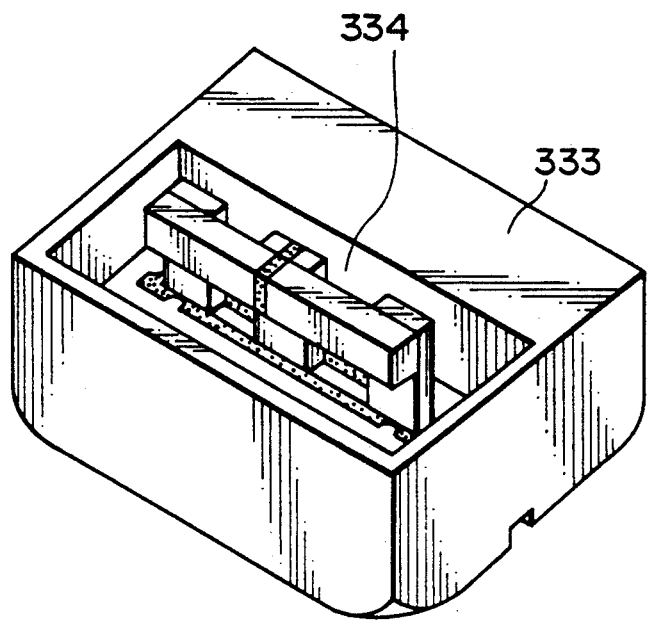

Referring next to FIGS. 3 through 5, there is shown the second embodiment of the present invention. FIG. 3 is an exploded view illustrating various components separately; FIG. 4 is a perspective view of the components assembled as viewed from the front side; and FIG. 5 is a perspective view of these components as viewed from the back side.

As seen from these figures, a magnetic core 310 which is used for recording and reproducing comprises an outer core section 311, an inner magnetic core section 312 and a recording and reproducing gap 313 formed between the outer and inner core sections 310, 311. The outer core section 311 includes a recording and reproducing coil 314 wound therearound for providing a magnetomotive force to the magnetic recording and reproducing core 310.

A magnetic erasing core 320 comprises an outer core section 321, an inner core section 322 and an erasing gap 323 interposed between the outer and inner core sections 321, 322. The outer core section 321 includes an erasing coil 324 for providing a magnetomotive force to the magnetic erasing core 320.

The magnetic recording and reproducing core 310 is bonded to the magnetic erasing core 320 by any suitable bonding means such as adhesive or glass to form a one-piece body which will be referred to a "magnetic composite core 340".

Both the coils 314 and 324 will be omitted in FIG. 5 for clarity.

The magnetic cores 310 and 320 cannot be directly used since they do not provide a magnetic closed circuit. This is because only these magnetic cores provides a magnetic open circuit having an excessive resistance of magnetism as a whole and too low efficiency of recording and reproducing. In order to overcome this, the present invention utilizes a back core 331 to form a magnetic closed circuit with the magnetic cores 310 and 320.

A slider 332 is formed of a soft magnetic material having a large permeability $\mu$, a large maximum saturated magnetic flux density B. and a small coercive force $H_c$, such a soft magnetic material being represented by $M_nZ_n$ ferrite. This provides one of the features in this embodiment. Such a feature is based on various considerations whether or not a soft magnetic material such as $M_nZ_n$ ferrite or the like can be substituted for the slider materials used in the prior art, such as calcium titanate ceramics and barium titanate ceramics and whether or not the use of soft magnetic material can make the slider itself to have a magnetism shielding function without need of the conventional magnetism shield ring of permalloy.

The slider 332 is of a of substantially rectangular parallelepiped profile and includes a recess 334 (FIG. 5) in the back side 333. The slider 332 also includes an aperture 336 formed therethrough and opened at the front side 335 and also at the bottom of the recess 334. The aperture 336 receives a magnetic composite core 340 which is in turn welded to the inner walls of the aperture 336 by a bonding glass 350 or the like.

The aperture 336 for receiving the magnetic core 340 is of a substantially rectangular cross-section with each of its longer sides including at least two protrusions 337 formed thereon. Each of the shorter sides in the aperture 336 includes at least one protrusion 338 formed thereon.

Figure 6:
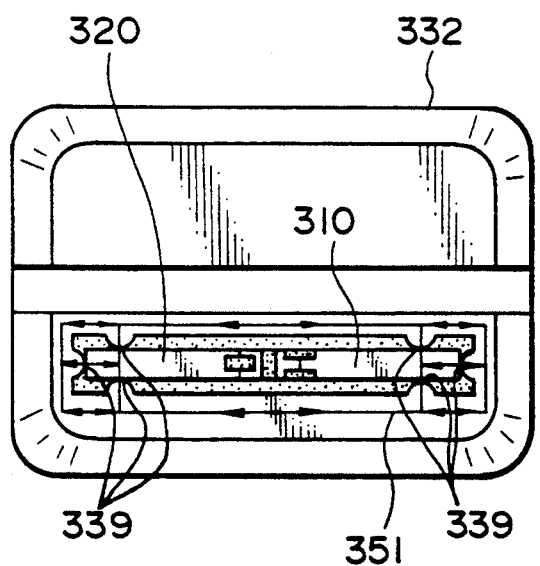
FIG. 6 is a plan view of the magnetic head according to the second embodiment, illustrating the surface oxidation therefor.
Figure 7:
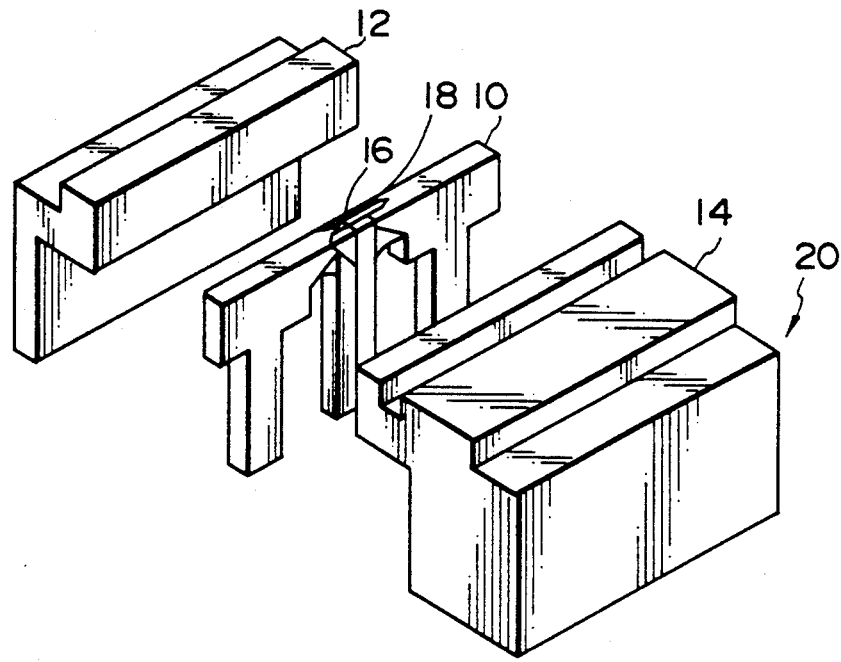
FIG. 7 is a perspective exploded view of a first example in the prior art.
Figure 8:
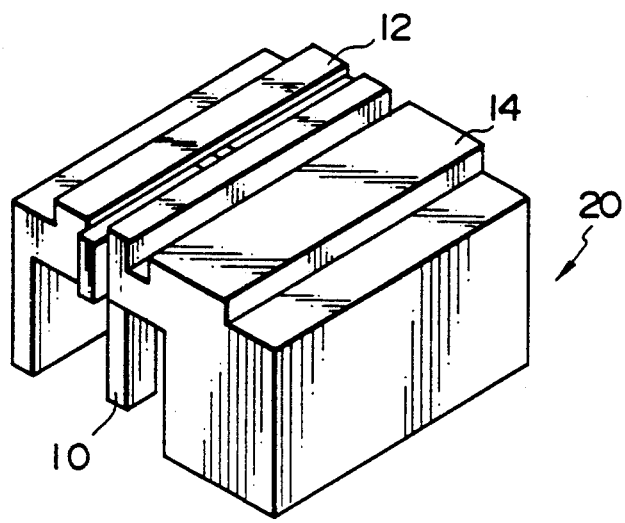
FIG. 8 is a perspective view of the prior art magnetic head shown in FIG. 7, illustrating it after assembled.
Figure 9A:
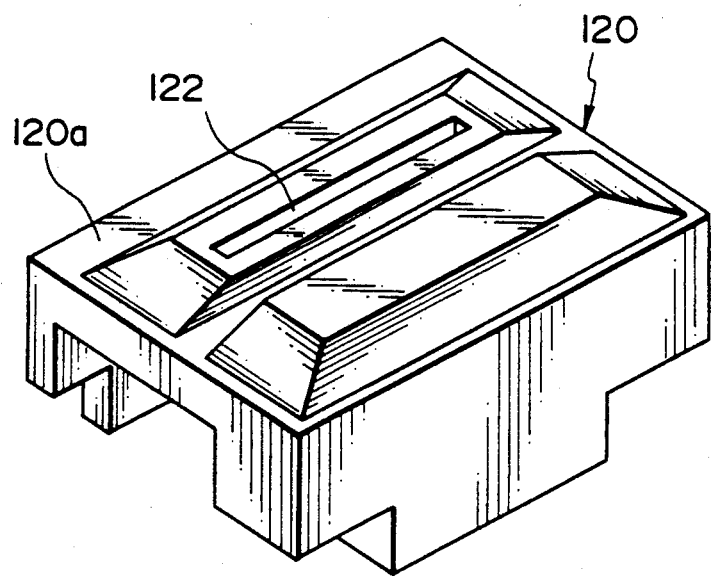
FIG. 9A is a perspective view of a slider in a second example according to the prior art.
Figure 9B:
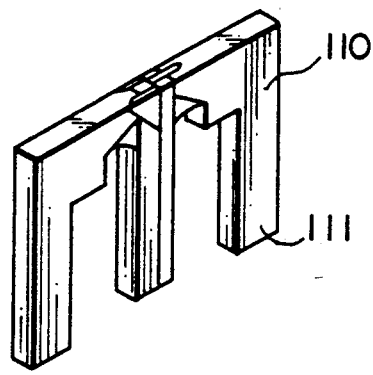
FIG. 9B is a perspective view of a core chip used in the second prior art example shown in FIG. 9A.
Figure 9C:
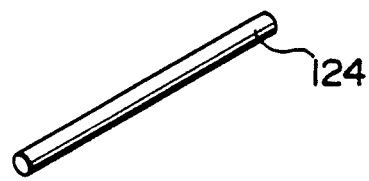
FIG. 9C is a perspective view of an inorganic glass rod used in the second prior art example shown in FIG. 9A.
Figure 10A:
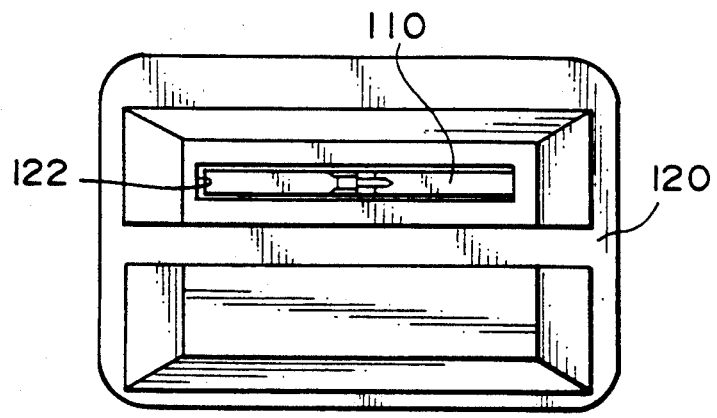
FIG. 10A is a plan view of the second prior art example, illustrating the core chip located in the core chip holding aperture at a longitudinally offset position.
Figure 10B:
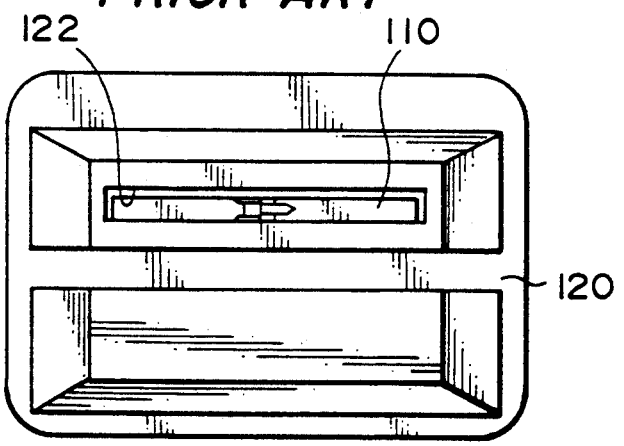
FIG. 10B is a plan view of the second prior art example, illustrating the core chip located in the core chip holding aperture at a laterally offset position.
Figure 10C:
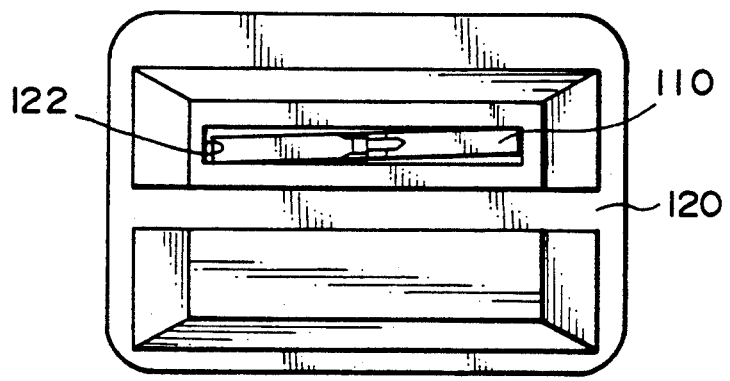
FIG. 10C is a plan view of the second prior art example, illustrating the core chip located in the core chip holding aperture at a skewed position.

FIG. 6 is a top view of the front side 335 of the slider 332 shown in FIG. 4. Since the magnetic composite core 340 is formed of the same material as that of the slider 332, that is, a soft magnetic material such as $M_nZ_n$ ferrite, a magnetic flux can flow in the slider 332 sufficiently. As shown by solid arrowheaded line 351 in FIG. 6, the magnetic flux can flow from the magnetic recording and reproducing core section 310 through the slider 332 to the magnetic erasing core section 320 and therefrom back to the magnetic recording and reproducing core section 310 via the slider 332. At this time, a gap 339 between one of the protrusions of the slider 332 and the magnetic core may provide a secondary recording and reproducing gap. If it is so, any harmful information will be written in a magnetic recording medium. In order to avoid such a problem, the slider 332 may be oxidized after it has been moulded and sintered. This causes the surface of the slider to have a non-magnetic layer having a thickness ranged between 100 microns and 300 microns. Thus, the magnetic resistance can be increased at that protrusion and near the gap 339 so that the increased resistance will substantially inhibit the flow of a magnetic flux as shown by solid arrowheaded line 351 in FIG. 6. The aforementioned range of thickness in the slider 332 can be attained by controlling temperature and partial oxygen pressure in the oxidation while maintaining the property of the soft magnetic material in the other areas. Thus, the slider 332 can also have a function of absorbing any electromagnetic noise from the exterior of the slider. In such a manner, the absorption of noise can be very improved since the magnetic core has an increased permeability in high frequency bands and the same magnetic property as in the magnetic composite core, different from the conventional magnetic core of permalloy.

The temperature of oxidation is ranged between 500° C. and 1000° C. while the partial oxygen pressure is range between 1% and 50%. The degree of non-magnetism aforementioned can be controlled by increasing the partial oxygen pressure when the temperature is lower or by decreasing the partial oxygen pressure when the temperature is higher.

The longer and shorter side protrusions 337 and 338 of the core receiving aperture serve to position the magnetic core precisely at a predetermined position while the wall portions of the aperture other than the protrusions provide increased gaps between those wall portions and the core chip, which gaps facilitate the entrance of molten glass thereinto.

As will be apparent from the foregoing, the present invention provides a magnetic head which has a good S/N ratio by providing the improved efficiency of absorption of the external noises. As a result, the magnetic head will have an improved symmetry in the recording and reproducing waveforms and is economically advantageous in that it can be reliably used without need of any magnetic shield spacer at the central portion of the back core 331.

Since a single one-piece type slider 332 of soft magnetic material such as $M_nZ_n$ ferrite or the like is substituted for the conventional two-piece or multi-piece type assembly which comprises a slider made of calcium titanate ceramics or the like and a magnetic shield ring formed of permalloy, the magnetic head of the present invention can be greatly reduced in manufacturing and assembling cost. Although the conventional magnetic head might create crack in the moulding of glass surrounding the core and slider since the magnetic core was different in coefficient of thermal expansion from the slider, the magnetic head of the present invention will produce substantially no crack in the moulding of glass due to the differential coefficient of thermal expansion since the magnetic cores 310 and 320 are made of the same material as that of the slider 332.

What is claimed is:

1. A magnetic head comprising:
   a) a core chip formed of magnetic material and including a plurality of gaps formed therein at the side of the core chip to contact a magnetic recording medium;
   b) a slider including an aperture receiving said core chip, said aperture being opened at the surface of said slider and having longer and shorter side inner walls on which at least more than one protrusion extending into said aperture from said inner walls for positioning and constraining said core ship within said aperture are formed;
   c) a fusible member in a clearance between said aperture and said core chip received in said aperture, said core chip being welded to the inner walls of said aperture by said fusible member; and
   d) a layer of non-magnetic material provided on said inner walls of said aperture.

2. A magnetic head as defined in claim 1 wherein said protrusions comprises at least two longer side protrusions formed on each of the longer opposed walls of said aperture, the longer side protrusions adapted to position and constrain the core chip in a direction across the spacing between said longer opposed walls of said aperture.

3. A magnetic head as defined in claim 1 wherein said protrusions comprises at least one shorter side protrusion formed on each of the shorter opposed walls of said aperture, the shorter side protrusions adapted to position and constrain the core chip in a direction across the spacing between said shorter opposed walls of said aperture.

4. A magnetic head as defined in claim 1 wherein said protrusions comprises at least one shorter side protrusions formed on each of the longer opposed walls of said aperture, the shorter side protrusions adapted to position and constrain the core chip in a direction across the spacing between said shorter opposed walls of said aperture.

5. A magnetic head as defined in claim 1 wherein said protrusions are of a square cross-section.

6. A magnetic head as defined in claim 1 wherein said fusible member is made of glass.

7. A magnetic head comprising:
   a) a core chip formed of magnetic material and including a plurality of gaps formed therein at the side of the core chip to contact a magnetic recording medium;
   b) a slider made of soft magnetic material, said slider including an aperture receiving said core chip, said aperture being opened at the surface of said slider and having longer and shorter side inner walls on which at least more than one protrusion extending into said aperture from said inner walls for positioning and constraining said core ship within said aperture are formed;
   c) a fusible member in a clearance between said aperture and said core chip received in said aperture, said core chip being welded to the inner walls of said aperture by said fusible member; and
   d) a layer of non-magnetic material provided on said inner walls of said aperture.

8. A magnetic head as defined in claim 7 wherein the soft magnetic material of said slider is $M_nZ_n$ ferrite.

9. A magnetic head as defined in claim 7 wherein at least the inner walls of said aperture in the slider are formed of non-magnetic material.

10. A magnetic head as defined in claim 9 wherein the non-magnetic material of the inner aperture walls is formed from surface oxidation.

11. A magnetic head as defined in claim 10 wherein the thickness of said inner non-magnetic aperture walls is adjusted by regulating temperature and partial oxygen pressure in the surface oxidation.

12. A magnetic head as defined in claim 9 wherein the thickness of the inner non-magnetic aperture walls is ranged between about 100 microns and 300 microns.

13. A magnetic head as defined in claim 7 wherein said protrusions comprises at least two longer side protrusions formed on each of the longer opposed walls of said aperture, the longer side protrusions adapted to position and constrain the core chip in a direction across the spacing between said longer opposed walls of said aperture.

14. A magnetic head as defined in claim 7 wherein said protrusions comprises at least one shorter side protrusion formed on each of the shorter opposed walls of said aperture, the shorter side protrusions adapted to position and constrain the core chip in a direction across the spacing between said shorter opposed walls of said aperture.

15. A magnetic head as defined in claim 13 wherein said protrusions comprises at least one shorter side protrusion formed on each of the shorter opposed walls of said aperture, the shorter side protrusions adapted to position and constrain the core chip in a direction across the spacing between said shorter opposed walls of said aperture.

16. A magnetic head as defined in claim 7 wherein said protrusions are of a square cross-section.

17. A magnetic head as defined in claim 7 wherein said fusible member is made of glass.

* * * * *